United States Patent [19]

Ernst

[11] Patent Number: 4,564,294
[45] Date of Patent: Jan. 14, 1986

[54] ENCAPSULATED PHOTOELECTRIC MEASURING SYSTEM

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 584,825

[22] Filed: Feb. 29, 1984

[30] Foreign Application Priority Data

Mar. 26, 1983 [DE] Fed. Rep. of Germany ....... 3311118

[51] Int. Cl.⁴ ............................................. G01B 11/14
[52] U.S. Cl. .................................. 356/374; 33/125 C; 250/237 G; 356/375
[58] Field of Search ............... 356/373, 374, 375, 395; 250/237 G; 33/125 A, 125 C; 350/589

[56] References Cited

U.S. PATENT DOCUMENTS

| | | | |
|---|---|---|---|
| 3,816,002 | 6/1974 | Wieg | 356/395 |
| 3,816,003 | 6/1974 | Litke | 33/125 C |
| 3,833,303 | 9/1974 | Burns et al. | 356/374 |
| 4,063,086 | 12/1977 | Hirose | 356/395 X |
| 4,136,958 | 1/1979 | Nelle | 33/125 C X |
| 4,295,742 | 10/1981 | Nelle et al. | 356/375 X |
| 4,477,726 | 10/1984 | Reichi | 33/125 C X |

FOREIGN PATENT DOCUMENTS 2846768 10/1978 Fed. Rep. of Germany.

Primary Examiner—F. L. Evans
Attorney, Agent, or Firm—Willian Brinks Olds Hofer Gilson & Lione Ltd.

[57] ABSTRACT

An encapsulated photoelectric measuring system for measuring the relative position of two objects includes a housing which encloses a scanning unit positioned to scan the graduation of a measuring scale. The housing defines a longitudinal slit closed by sealing elements, and a coupling member passes between the sealing elements and connects the scanning unit with one of the objects to be measured. In order to avoid optical disturbances of the beam path of the photoelectric scanning by liquid drops on the measuring scale, the scanning unit is hermetically sealed. The spacing between the surfaces of the scale acted upon by the light beams and the associated surfaces of the scanning unit is made so small that any liquid drops present on the surfaces of the scale in the region of the scanning unit are spread or formed into a continuously homogeneous wetted liquid layer.

7 Claims, 6 Drawing Figures

ENCAPSULATED PHOTOELECTRIC MEASURING SYSTEM

BACKGROUND OF THE INVENTION

This invention relates to an improvement in encapsulated photoelectric measuring systems for measuring the relative position of two objects, of the type which include a measuring scale, a scanning unit for scanning the scale, means included in the scanning unit for illuminating at least a first surface of the scale, means for connecting the scanning unit with one of the two objects, a housing which encapsulates the scale and the scanning unit and defines an opening through which the connecting means passes, and at least one sealing element for sealing the opening.

Such photoelectric measuring systems are used for example in machine tools for measuring lengths or angles. These measuring systems typically must therefore be protected against environmental influences in the form of oil, cooling water, processing chips, dust and the like. One prior art approach to protection of a measuring system is shown in German Patent DE-PS No. 28 46 768. The disclosed system includes a housing for the scale and the scanning unit. This housing defines a slit running along the longitudinal direction, which slit is closed by elastomeric sealing lips. A follower extends between these sealing lips to connect the scanning unit with one of the two objects to be measured. Such sealing lips have been found to operate effectively to prevent the penetration of liquids and chips or shavings into the interior of the housing. However, such sealing lips typically cannot completely keep out liquids in the form of vapor and mist that may condense within the housing. In the event mist condenses to form liquid drops on the surfaces of the scale or the scanning plate of the scanning unit, such drops have the optical effect of collecting lenses. These drops can therefore interfere with the optical scanning of the scale and can disturb the photoelectric scanning of the graduation of the scale. Measuring inaccuracies can result from such disturbances. In addition, when a scanning unit includes printed circuits, as for example in conjunction with photosensors included in the scanning unit, condensing mist presents the danger of electrical short circuits.

SUMMARY OF THE INVENTION

The present invention is directed to an improved measuring system which operates at high measuring accuracy even when used in a harsh environment which includes high concentrations of vapor, fog, mist and the like.

According to this invention, an encapsulated photoelectric measuring system of the type described initially above is provided with means for hermetically sealing the scanning unit. This scanning unit sealing means includes a photopermeable surface positioned adjacent to the first surface of the scale and substantially parallel thereto. The photopermeable surface and the first surface of the scale define a gap therebetween having a width sufficiently small to spread any liquid drops on the first surface in the region of the photopermeable surface into a continuously homogeneous liquid layer.

The present invention provides the important advantages that with a remarkably simple structure a photoelectric measuring system is provided which is fully usable even under extremely unfavorable conditions, for example in the case of processing centers closed on all sides, without impairment of measuring accuracy. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 1b is a sectional view taken along line Ib—Ib of FIG. 1a.

FIG. 2b is a sectional view taken along line IIb—IIb of FIG. 2a.

FIG. 3b is a sectional view taken along line IIIb—IIIb of FIG. 3a.

DETAILED DESCRIPTION OF THE PRESENTLY PREFERRED EMBODIMENTS

Figure 1A:
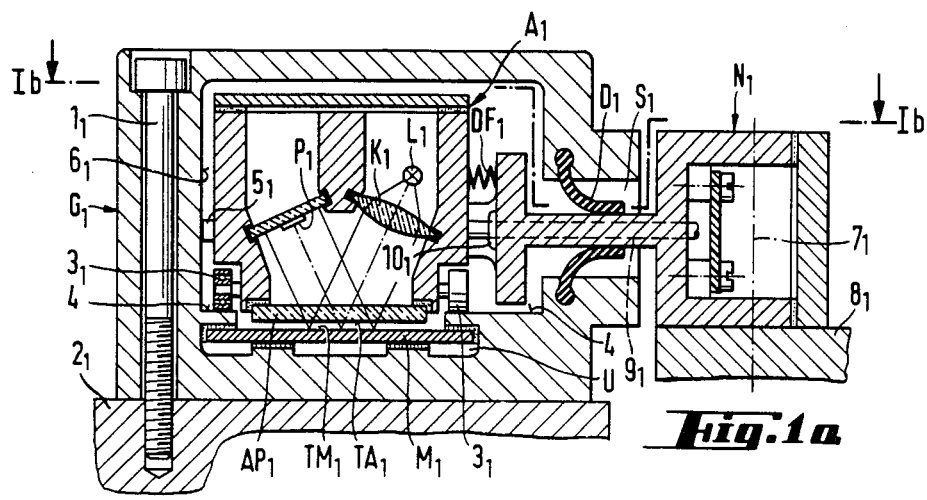
FIG. 1a is a transverse sectional view taken along line Ia—Ia of FIG. 1b of an encapsulated length measuring system which operates according to the direct illumination measuring principle and incorporates a first preferred embodiment of this invention.
Figure 1B:
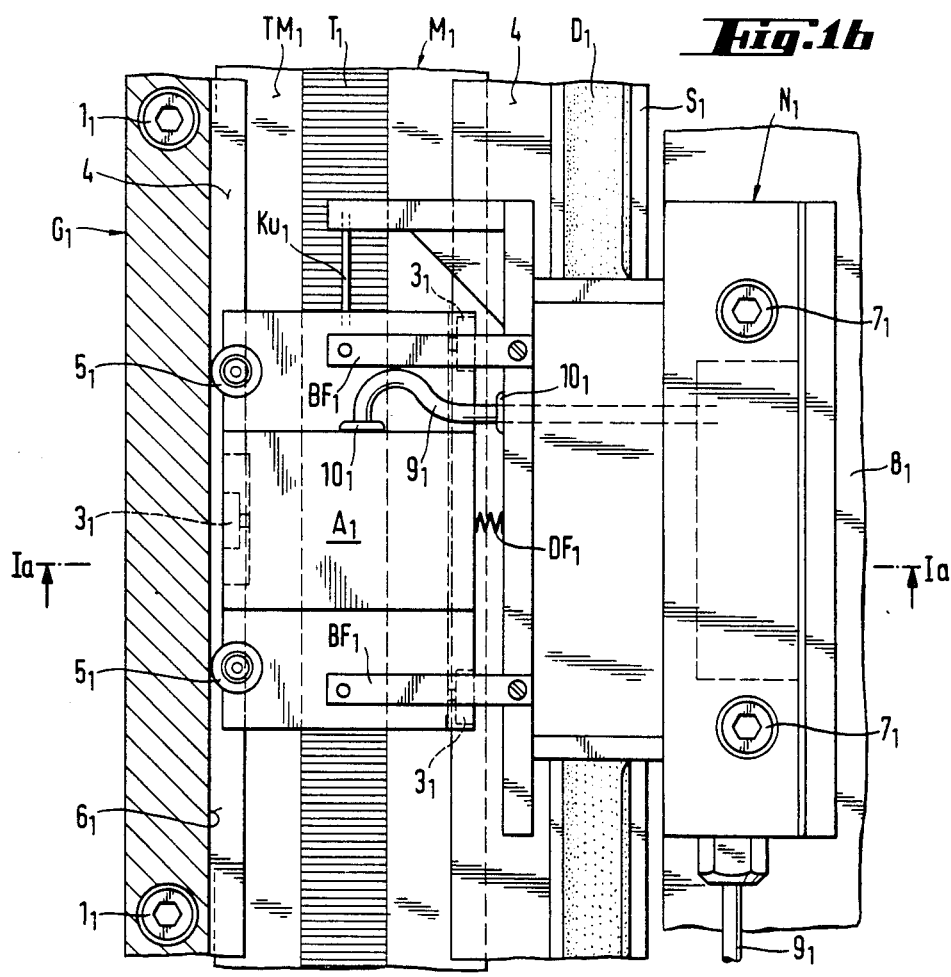

Turning now to the drawings, FIGS. 1a and 1b represent in cross section and longitudinal section two views of an encapsulated, incremental, length measuring system which operates according to the reflected light measuring principle and incorporates a first preferred embodiment of this invention.

This measuring system includes a housing $G_1$ which is secured by means of screws $1_1$ to a bed $2_1$ of a machine tool. The housing $G_1$ defines a groove U in which is mounted a scale $M_1$. The scale $M_1$ defines a measuring graduation $T_1$ which is scanned by a scanning unit $A_1$. The scanning unit $A_1$ includes a light source $L_1$, a condensor lens $K_1$, a scanning plate $AP_1$ and a photosensor $P_1$. The scanning plate $AP_1$ defines a graduation (not shown) which corresponds to the graduation $T_1$ of the scale $M_1$. The scanning unit $A_1$ is guided along the scale $M_1$ by means of rollers $3_1$ and two leaf springs $BF_1$ on a base surface 4, and by means of rollers $5_1$ and a pressure spring $DF_1$ on a side surface $6_1$ of the housing $G_1$. The housing $G_1$ defines a slits $S_1$ which extends along the longitudinal length of the housing $G_1$ and is closed by means of a pair of flexible sealing lips $D_1$ sloped together in the form of a roof. A coupling member $N_1$ which defines a sword-shaped middle section extends through the slit $S_1$ and is in sealing engagement with the sealing lips $D_1$. The coupling member $N_1$ is fastened by means of screws $7_1$ to a slide piece $8_1$ of the machine tool. The slide piece $8_1$ is slidable relative to the bed $2_1$ along the direction of the scale $M_1$. The coupling member $N_1$ is coupled by means of a coupling $KU_1$ in the form of a wire rigid in the measuring direction to the scanning unit $A_1$. When the machine parts $2_1$, $8_1$ move relative to one another, the graduation $T_1$ of the scale $M_1$ is scanned by the scanning unit $A_1$, which generates measuring signals in response thereto that are fed over line $9_1$ through the coupling member $N_1$ to an evaluating and display unit (not shown). The outputs of the line $9_1$ at the scanning unit $A_1$ and at the coupling member $N_1$ in the interior of the housing $G_1$ are sealed by means of seals $10_1$.

The sealing lips $D_1$ prevent the penetration of liquids and processing chips into the interior of the housing $G_1$. However, the sealing lips $D_1$ cannot completely keep out fluids in the form of vapor, fog and mist that may condense in drop form inside the housing $G_1$. In order to prevent liquid drops (which have the optical affect of collecting lenses) from forming on the graduation surface $TM_1$ of the scale $M_1$ and on the surfaces of the elements $L_1$, $K_1$, $AP_1$, $P_1$ of the scanning unit $A_1$ (which may disturb the beam path of the photoelectric scanning), the scanning unit $A_1$ is hermetically sealed chamber which includes the scanning plate $AP_1$ as one of the walls of the chamber. The scanning plate $AP_1$ is positioned adjacent and parallel to the scale $M_1$, and a gap is defined between the graduation surface $TA_1$ of the scanning plate $AP_1$ and the graduation surface $TM_1$ of the scale $M_1$. The width of this gap is dimensioned so small that any liquid drops which may possibly be present on the graduation surface $TM_1$ of the scale $M_1$ in the zone of the scanning plate $AP_1$ of the scanning unit $A_1$ are spread or formed into a continuously homogeneous liquid layer. Preferably, the width of this gap is no more than about 0.5 mm.

Figure 2A:
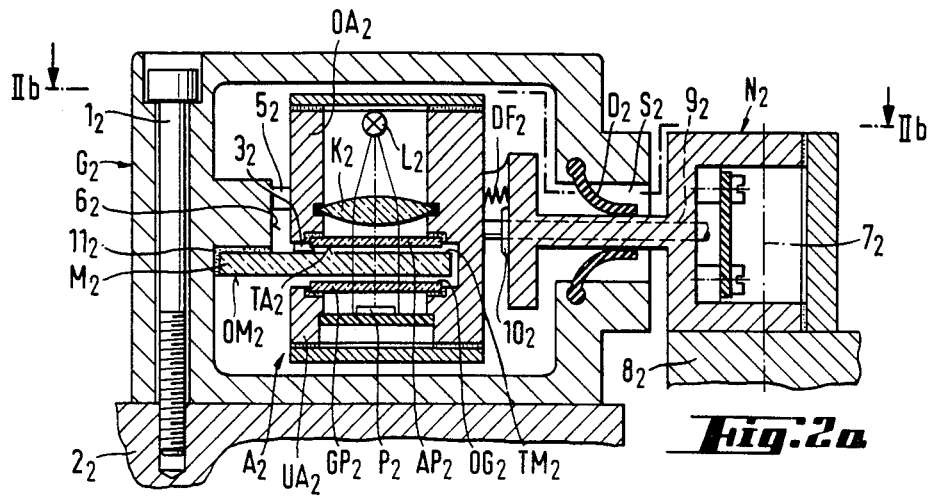
FIG. 2a is a transverse sectional view taken alone line IIa—IIa of FIG. 2b of an encapsulated length measuring system which operates according to the transmitted light principle and incorporates a second preferred embodiment of this invention.
Figure 2B:
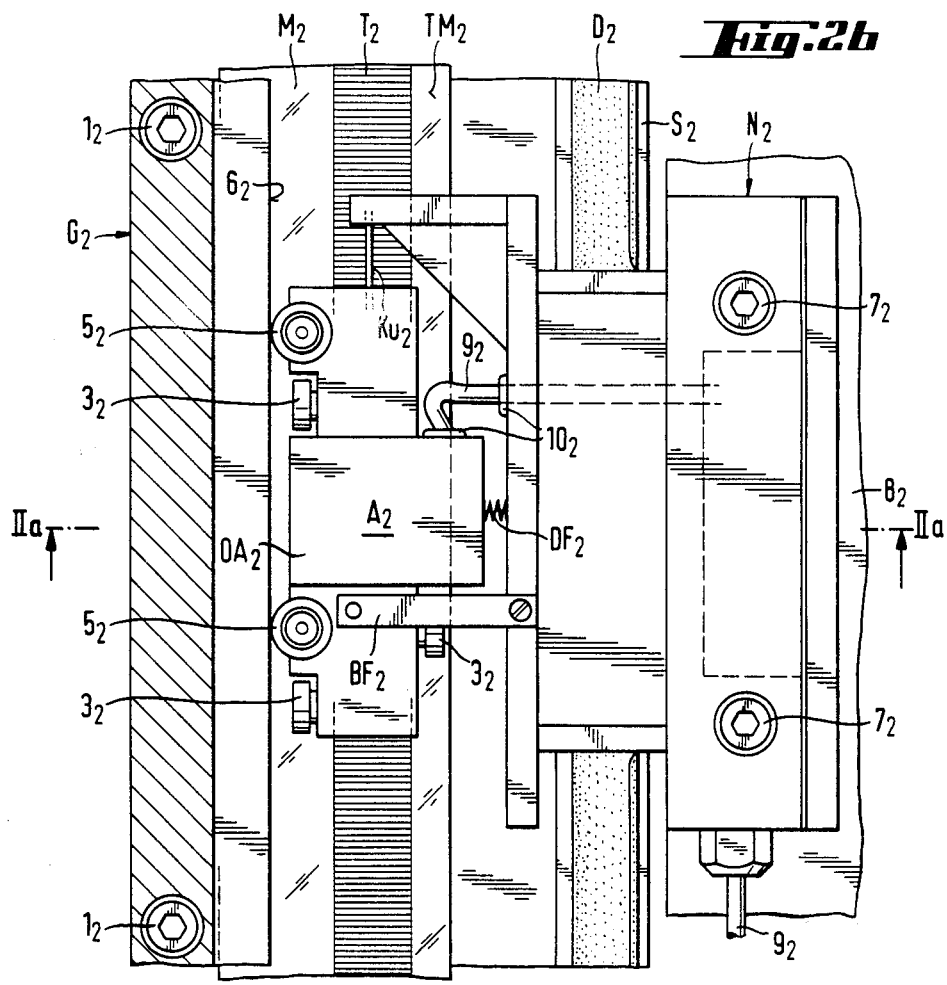

FIGS. 2a and 2b present in cross section and in longitudinal section two views of an encapsulated incremental length measuring system which operates according to the transmitted light measuring principle in which includes a second preferred embodiment of this invention. The measuring system of FIGS. 2a and 2b corresponds in many respects with the measuring system shown in FIGS. 1a and 1b, and corresponding elements of the system of FIGS. 2a and 2b are provided with the same reference symbols, but with the subscript "2".

In contrast to the measuring system of FIGS. 1a and 1b, the scale $M_2$ is fastened by means of an adhesive layer $11_2$ to an inner surface of the housing $G_2$. A scanning unit $A_2$ is guided by means of rollers $3_2$ and a leaf spring $BF_2$ on the graduation surface $TM_2$ of the scale $M_2$. The scanning unit $A_2$ extends around the scale $M_2$ on both sides of the scale $M_2$. In order to avoid distortions of the beam path of the photoelectric scanning system by means of liquid drops, the upper part of the scanning unit $OA_2$ which includes a light source $L_2$ and a condenser lens $K_2$ is hermetically sealed as a chamber which includes a scanning plate $AP_2$ as one wall of the chamber. The lower part of the scanning unit $UA_2$ includes a photosensitive element $P_2$, and this lower part of the scanning unit $A_2$ is also hermetically sealed as a chamber, one wall of which is defined by a glass plate $GP_2$. As shown in FIG. 2a, the graduation surface $TA_2$ of the scanning $AP_2$ is directly opposite, parallel, and spaced with respect to the graduation surface $TM_2$ of the scale $M_2$. In addition, the glass plate $GP_2$ defines a surface $OG_2$ which is situated directly opposite to the surface $OM_2$ of the scale $M_2$ lying opposite the graduation surface $TM_2$. The separation between the graduation surface $TM_2$ and the graduation surface $TA_2$ on the one hand as well as the separation between the surface $OM_2$ and the surface $OG_2$ on the other hand are both made so small that any liquid drops possibly present on the graduation surface $TM_2$ and the surface $OM_2$ of the scale $M_2$ in the region of the scanning plate $AP_2$ of the scanning unit $A_2$ are formed or spread into a continuously homogeneous liquid layer. Each of the separations should preferably be less than approximately 0.5 mm.

Figure 3A:
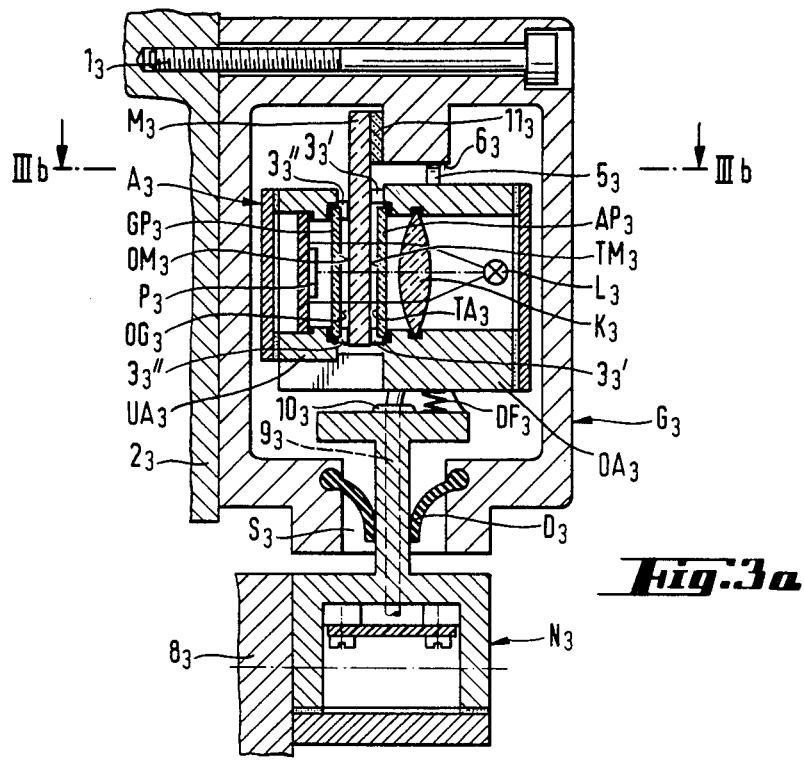
FIG. 3a is a transverse sectional view taken along line IIIa—IIIa of FIG. 3b of an encapsulated length measuring system which operates according to the transmitted light principal and incorporates a third preferred embodiment of this invention.
Figure 3B:
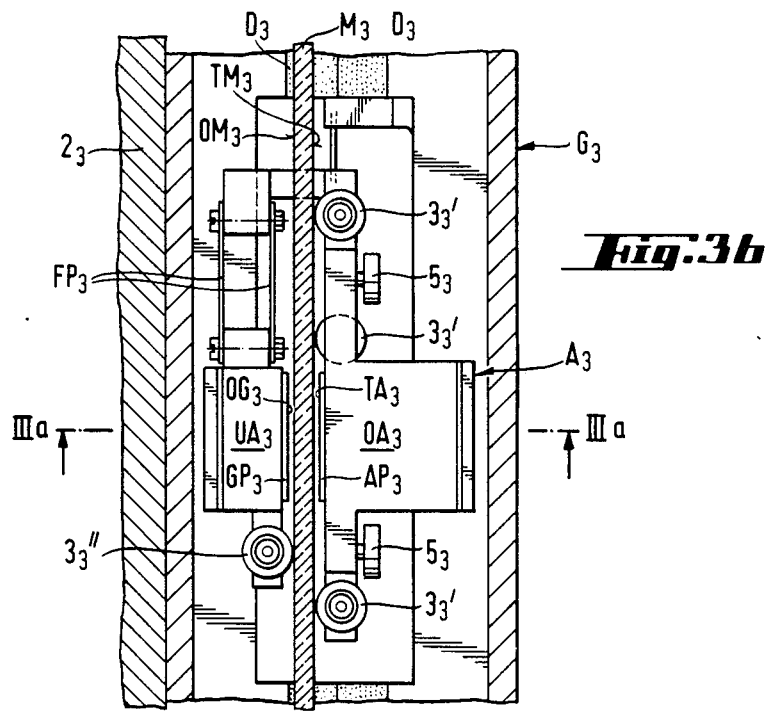

FIGS. 3a and 3b provide cross sectional and longitudinal sectional views of an encapsulated incremental length measuring system which likewise operates according to the transmitted light measuring principle and which incorporates a third preferred embodiment of this invention. The system of FIGS. 3a and 3b corresponds essentially with the system of FIGS. 2a and 2b and corresponding elements in the two embodiments are provided with the same reference symbol, but with a subscript "3" in the system of FIGS. 3a and 3b.

In contrast to the length measuring system of FIGS. 2a and 2b, the scanning unit $A_3$ includes an upper scanning unit component $OA_3$ and a lower scanning unit component $UA_3$ which are joined together one with the other by means of a joint or a spring parallelogram $FP_3$. The spring parallelogram $FP_3$ can be made up of a number of leaf springs arranged parallel to one another so as to allow the lower scanning unit component $UA_3$ to deflect left and right as shown in FIG. 3b. The upper scanning unit component $OA_3$ is guided by means of rollers $3_3'$ on a graduation surface $TM_3$ of a scale $M_3$, and the lower scanning unit component $UA_3$ is guided by means of rollers $3_3''$ on a surface of the scale $M_3$ lying opposite to the graduation surface $TM_3$. In this way even with relatively great tolerances in the thickness of the scale $M_3$ a small, parallel spacing is assured between the graduation surface $TM_3$ of the scale $M_3$ and the graduation surface $TA_3$ of the scanning plate $AP_3$ of the upper scanning unit component $OA_3$. Similarly, a small, parallel spacing is assured between the surface $OM_3$ of the scale $M_3$ lying opposite to the graduation surface $TM_3$ and a surface $OG_3$ of a glass plate $GP_3$ of the lower scanning unit component $UA_3$ of the scanning unit $A_3$. These small parallel spacings on both sides of the scale $M_3$ form any drops adhering to the scale $M_3$ into a continuously homogeneous liquid layer in the region of the scanning plate $AP_3$ of the scanning unit $A_3$. The upper scanning unit component $OA_3$ which includes a light source $L_3$ and a condenser lens $K_3$ is hermetically sealed in part by the scanning plate $AP_3$. Similarly, the lower scanning unit component $UA_3$ of the scanning unit $A_3$ which includes a photosensor $P_3$ is hermetically sealed in part by the glass plate $GP_3$.

The spacings between the surfaces TM, TA and OM, OG, respectively, of the scale M and of the scanning unit A are preferably chosen to be so small that even a dirty or cloudy liquid on the scale M has no substantial influence on the photoelectric scanning. Because the scanning unit is hermetically sealed or encapsulated, problems related to electronic short circuits in printed circuits by fluid action in the scanning unit A are entirely avoided.

The scanning unit $A_1$, $A_2$ as well as the upper scanning unit component $OA_3$ and the lower scanning unit component $UA_3$ of the scanning unit $A_3$ include in each case a case which is closed over a cover, which case encloses at least the illumination unit L, K as well as the photoelectric sensors P.

Of course, it should be understood that a wide range of changes and modifications can be made to the preferred embodiments described above. For example, the invention can readily be adapted for use with photoelectric angle measuring systems as well as in encapsulated measuring systems in which openings in the housing are closed with any desired sealing means. It is therefore intended that the foregoing detailed description be regarded as illustrative rather than limiting, and that it be understood that it is the following claims, including all equivalents, which are intended to define the scope of this invention.

I claim:

1. In an encapsulated photoelectric measuring system for measuring the relative position of two objects, of the type comprising a measuring scale, a scanning unit for scanning the scale, means, included in the scanning unit, for illuminating at least a first surface of the scale, means for connecting the scanning unit with one of the two objects, a housing which encapsulates the scale and the scanning unit and defines an opening through which the connecting means passes, and at least one sealing element for sealing the opening, the improvement comprising:

means for hermetically sealing the scanning unit, said scanning unit sealing means comprising:
a photopermeable surface positioned adjacent to the first surface of the scale substantially parallel thereto, said photopermeable surface and said first surface defining a gap therebetween having a width sufficiently small to spread liquid drops on the first surface in the region of the photopermeable surface into a continuously homogeneous wetted liquid layer.

2. The invention of claim 1 wherein the width of the gap is less than about 0.5 mm.

3. The invention of claim 1 wherein the scale defines a second surface, opposed to the first surface, wherein one of the first and second surfaces defines a graduation, and wherein the scanning unit comprises:

an upper scanning unit component;
a lower scanning unit component;
means for movably interconnecting the upper and lower scanning unit components;
means for guiding the upper scanning unit component on the one of the first and second surfaces that defines the graduation; and
means for guiding the lower scanning unit component on the other of the first and second surfaces.

4. The invention of claim 3 wherein the interconnecting means comprises a spring parallelogram.

5. The invention of claim 3 wherein the interconnecting means comprises a joint.

6. The invention of claim 1 wherein the means for hermetically sealing the scanning unit seals at least the illuminating means and a photosensitive scanning element positioned to scan the scale, and wherein the means for hermetically sealing the scanning unit comprises a scanning plate included in the scanning unit.

7. The invention of claim 3 wherein the illuminating means is included in the upper scanning unit component, wherein the lower scanning unit component comprises a scanning photosensor positioned to scan the scale, and wherein the means for hermetically sealing the scanning unit comprises:

upper sealing means for hermetically sealing the upper scanning unit component, said upper sealing means comprising a scanning plate included in the upper scanning unit component; and
lower sealing means for hermetically sealing the lower scanning unit component, said lower sealing means comprising a transparent plate situated adjacent to the scale.

* * * * *